United States Patent [19]

Johal et al.

[11] Patent Number: 4,950,749
[45] Date of Patent: Aug. 21, 1990

[54] RECOVERY OF GLUCAN BY EMPLOYING A DIVALENT CATION AT AN ALKALINE PH

[75] Inventor: Sayit S. Johal, Sagamore Hills; George M. Coleman, Rocky River; both of Ohio

[73] Assignee: The Standard Oil Company, Cleveland, Ohio

[21] Appl. No.: 294,250

[22] Filed: Jan. 6, 1989

[51] Int. Cl.$^5$ .......................... C07G 17/00; C07H 1/06
[52] U.S. Cl. ...................................... 536/127; 536/124
[58] Field of Search .............................. 536/127, 124

[56] References Cited

U.S. PATENT DOCUMENTS

| | | | |
|---|---|---|---|
| 3,301,848 | 1/1967 | Halleck | 536/1.1 |
| 3,759,846 | 9/1973 | Komatsu | 252/527 |
| 3,785,896 | 1/1974 | Kassel | 156/97 |
| 3,900,462 | 8/1975 | Komatani et al. | 536/127 |
| 4,053,699 | 10/1979 | Cahalan et al. | 536/114 |
| 4,072,567 | 2/1978 | Yokobayashi et al. | 536/1.1 |
| 4,075,405 | 2/1978 | Takahashi et al. | 536/55.1 |
| 4,237,266 | 12/1980 | Sugiura et al. | 536/1.1 |
| 4,357,423 | 11/1982 | Cox et al. | 435/101 |

*Primary Examiner*—Ronald W. Griffin
*Assistant Examiner*—Everett White
*Attorney, Agent, or Firm*—Larry W. Evans; Joseph G. Curatolo; Teresan W. Gilbert

[57] ABSTRACT

A process for the recovery of nonionic glucans by adding a divalent cation to a solution containing solubilized glucan and then adjusting the solution to an alkaline pH resulting in the precipitation of glucan.

11 Claims, No Drawings

RECOVERY OF GLUCAN BY EMPLOYING A DIVALENT CATION AT AN ALKALINE PH

This application is related to an application filed at the same time relating to recovery of polysaccharides, and entitled "Recovery of Polysaccharides by Employing a Divalent Cation With a Water Miscible Organic Solvent".

BACKGROUND OF THE INVENTION

The invention relates to a process for the recovery of solubilized nonionic glucan in a solution. Further, the invention relates to employing a divalent cation at an alkaline pH to recover the solubilized nonionic glucan from solution.

Current procedures teach the use of a water miscible organic solvent such as isopropyl alcohol or acetone for the recovery of nonionic polysaccharides, in particular glucan from fermentation media and other glucan containing solutions. As practiced, the clarified media is concentrated to a flowable viscosity and precipitated with 50% by volume solvent. The precipitate is drained and then successively treated with higher concentrations of the water miscible organic solvent. This process which requires the media volumes to be reduced and concentrated and large quantities of solvent is an expensive, capital intensive procedure.

U.S Pat. No. 3,759,896 discloses a process to produce polysaccharides with antitumor activity mainly consisting of B-(1→3)-linked D-glucose residue by obtaining culture filtrates of fungi belonging to Ascomycetes, Basidiomycetes and Fungi imprefecti and then purifying the culture filtrate by sequential treatments of acidification, deionization by ion exchange resins and precipitation with a water soluble miscible solvent.

U.S. Pat. No. 4,072,567 discloses a process for producing a water-insoluble glucan by cultivating a Streptococcus microrganism in a liquid medium and recovering the glucan by sedimentation, filtration or seiving. The crude glucan is further processed by dissolving in sodium hydroxide, centrifuging, neutralizing with hydrogen chloride and then washing.

Xanthan gum, an anionic polysaccharid, is a fermentation product of the bacteria Xanthomonas campestris. The gum is recovered from the fermentation broth by salt precipitation. Known precipitating agents for the gum include quarternary amine salt precipitation (U.S. Pat. No. 3,119,812); aluminum salt precipitation (U.S. Pat. No. 4,051,317); amine salt precipitation (U.S. Pat. No. 4,254,257) and alkaline precipitation in the presence of divalent cations (U.S. Pat. No. 3,382,229). However, xanthan gum is structurally distinct from nonionic glucons.

It is desirable to find novel methods to recover glucans from solution. Further, it is desirable to reduce recovery costs of glucan as an economic improvement for commercializing a process to recover glucans.

Polysaccharides have been used extensively in the food, cosmetic, paper, pharmaceutical, oil and chemical manufacturing industries. The process of the instant invention is useful in that polysaccharides, in particular glucans are useful as viscosifiers, binders, thickners and stabilizers in industrial and food applications. Glucans have various industrial applications such as enhanced oil recovery and oil well drilling muds, tablet coatings, opthalmic solutions, anti-acid suspensions, porcelain and ceramic glazes, ceramic binders, water-based paints, paper coatings, printing inks, integrated circuit chips, agricultural seed coatings, pesticide sprays and the like.

It is an object of the instant invention to recover nonionic polysaccharides, in particular glucans from solution. It is another object of the instant invention to recover solubilized glucan from solution by precipitating the glucan from the solution with a divalent cation at an alkaline pH.

These and other objects, together with the advantages over known methods shall become apparent from the specification which follows and are accomplished by the invention as herein described and claimed.

SUMMARY OF THE INVENTION

The instant invention is a process for the recovery of an extracellular water soluble nonionic glucan comprising adding a divalent cation to a solution containing the solubilized glucan and then adjusting the solution to an alkaline pH by the addition of a metal hydroxide to form a glucan precipitate. The glucan precipitate is then recovered.

DETAILED DESCRIPTION OF THE INVENTION

The process of the instant invention is to recover extracellular water soluble nonionic glucan from solutions.

Generally, a glucan is defined as a polysaccharide substance composed of glucose and is characterized by 1-3 linked D-glycosyl units. The glucan recovered by the instant invention is water soluble. Exemplary glucans include but are not limited to scleroglucan, schizophyllan and the like. Scleroglucan and schizophyllan are characterized as follows: the polysaccharide is a linear chain of 1-3-linked D-glycosyl units with about 30 to about 35 percent of the linear chain containing single D-glycosyl units which are attached by 1-6 linkages. The average molecular weight is greater than or equal to $5 \times 10^6$. They are nonionic homopolysaccharides. They dissolve in water to form pseudoplastic solutions. The chains are self-associated and suggested to be in a triple helix arrangement.

Organisms that produce glucans are filamentous fungi, bacteria and the like. Typical filamentous fungi that produce glucans include but are not limited to organisms belonging to the genus Sclerotium, Sclerotinia, Corticum, Helotium, Stromatinia, Claviceps and the like. Exemplary organisms which produce glucans include but are not limited to Sclerotium glucanicum, Sclerotium delphinii, Sclerotium coffeicolum, Schizophyllum commune, Sclerotium rolfsii, Corticium rolsii, Sclerotinia gladod, Stromatinia narcissi and the like. The organisms listed in U.S. Pat. No. 3,301,848 to Halleck and in U.S. Pat. No. 3,759,896 to Komatsu et al. are also included as organisms that excrete glucan. Scleroglucan is produced by filamentous fungi of the genera Sclerotium, in particular by Sclerotium rolfsii, Sclerotium glucanicum, Sclerotium delphinii, Sclerotium coffeicolum and the like. Schizophyllan is produced by fungi of the genera Schizophyllum, in particular by Schizophyllum commune.

Conventional methods are employed in culturing the bio-organism for the production of the extracellular water soluble glucan. Typical cultivation methods employed include but are not limited to batch, batch fermentation, fed batch, semi-continuous fermentation, continuous fermentation and the like. In general, the process involves growing the organism, inoculating a batch of fermentable broth with the organism, allowing the organism to ferment and recovering the polysaccharide water soluble glucan from the broth.

The aqueous nutrient medium should provide a substrate for the production of the glucan by the organism. The aqueous nutrient medium will normally contain assimilable carbon and nitrogen sources, organic materials and if required, minor organic and inorganic nutrients such as trace salts, trace elements, vitamins, amino acids and the like.

The excreted water soluble glucan is then separated from the biomass in the medium by conventional techniques such as centrifugation, filtration and the like.

The present invention is directed toward recovery of the glucan from a solution containing the glucan which may be any solution containing glucan such as the clarified fermentation broth. The glucan is recovered from the solution by adding a divalent cation to the solution and then adjusting the solution to an alkaline pH by the addition of a metal hydroxide to precipitate the water soluble glucan from the solution.

The divalent cation is added with mixing to the solution containing the solubilized glucan. The addition can take the form of adding a solid, saturated solution or a dilute solution. The divalent cation can be employed either alone or in combination. The divalent cation is preferably divalent cation salts of the divalent metals of zinc, magnesium, manganese, iron, copper, cobalt and nickel. Exemplary divalent cations include but are not limited to calcium chloride, magnesium chloride, calcium sulfate, manganese chloride, iron chloride, zinc copper, calcium hydroxide and the like. The preferred divalent cations are calcium chloride, magnesium chloride and calcium sulfate. The concentration of the divalent cation ion added to the solution is in the range of about 0.1% to about 20%, preferably about 0.2% to about 10% and most preferably about 0.5% to about 2% of the volume of the solution.

When a calcium divalent cation salt is employed, the dissolution and mixing of the calcium divalent cation results in the appearance of an insoluble precipitate which is calcium oxalate, a complex of calcium and oxalic acid. The calcium oxalate is removed from the solution by conventional methods such centrifugation, filtration or the like.

The next step in the instant invention is that the solution is made alkaline to about pH of 10 to about pH 12, preferably to about pH 10.5 to about pH 11.5, by the addition of a metal hydroxide. The metal hydroxide can be used alone or in combination. Typical metal hydroxides include but are not limited to sodium hydroxide, potassium hydroxide and the like. Upon addition of the metal hydroxide the glucan is precipitated from the solution and collected for further processing.

The precipitated water soluble polysaccharide glucan complex is collected from the alkaline solution by conventional methods such as centrifugation, filtration and the like. The purity of the glucan can be increased by known methods such as repeated reprecipitation by raising and dropping the pH, rehydration and the like.

The sequential order of adding a divalent cation to the solution containing glucan and then adjusting the solution to an alkaline pH is critical in that (1) the use of only the divalent cation would not precipitate the glucan, (2) the alkaline pH range of the solution alone would not precipitate the glucan and (3) changing the order of the divalent cation and alkaline pH would not induce precipitation of the glucan. Consequently, the formation of a divalent cation-biopolymer complex prior to raising the pH is a requirement for precipitation of the glucan.

SPECIFIC EMBODIMENTS

The following examples further illustrate the present invention. These embodiments are presented by way of example and not by way of limitation of the scope of the invention. Further, it is understood that variations and modifications can be made by one skilled in the art without departing from the spirit and the scope of the invention.

EXAMPLE 1

About 120 mls of cell-free *Sclerotium rolfsii* shake flask fermentation broth having a viscosity of about 720 cps at about 10.2 sec $^{-1}$ and a pH of about 2.4 was diluted with about 55 mls of distilled water. The solution was thoroughly mixed using a magnetic stirrer for about 10 min. at room temperature.

About 5.25 gms of $CaC_2$ was dissolved in about 10 mls of water which was then added to the 175 mls of broth and mixed for about 5 min. at which time a whitish colored precipitate was observed. The final $CaC_{12}$ concentration was about 3% (weight/volume). The solution was mixed for another 15 min. and then centrifuged at about 20,000 X g for about 10 min. The decanted supernatant was clear and viscous with no apparent loss in viscosity. The pelleted precipitate was calcium oxalate, a by-product of this process.

A second addition of $CaC_2$, about 12.25 gms dissolved in 15 mls of water and then added to the supernatant and mixed for about 10 min. With this 7% (weight/volume) addition of $CaC_{12}$ the supernatant remained clear and viscous. No precipitation was observed indicating that no divalent cation precipitable material remained in solution.

The pH of the solution was then increased by the addition of about 40 mls of about 0.5N NaOH to attain a final pH of about 11.5. As the pH of the solution increased a whitish colored stringy floc and/or precipitate was observed and the viscosity of the solution declined to that of about water.

The flocculated/precipitated material was recovered from the solution by centrifugation at about 20,000 X g for about 12 min. The resulting nonviscous supernatant was decanted and tested for the presence of glucan by acidification and acetone precipitation (3 and 5 fold excess acetone to broth). Since no flocculation or precipitation was noted in the supernatant this suggested that the Ca-alkali treated solution was devoid of glucan. The supernatant was then discarded. The glucan was pelleted in a small volume. The glucan could be solubilized with acidified water.

This example demonstrated that (1) about 3% (w/v) $CaC_{12}$ precipitates all of the oxalic acid in the cell-free broth; (2) further addition of $CaC_2$, about 7% (w/v) does not induce precipitation of the scleroglucan or any other broth component; and (3) Ca-alkali treatment precipitates all of the scleroglucan in the broth.

EXAMPLE 2

Calcium chloride was added to four 20 ml samples of cell-free *Sclerotium rolfsii* fermentation broth, respectively, at the following concentrations 0, 0.5, 0.75 and 1% weight per volume. Each sample was then processed as follows: The 20 ml sample was vortexed for about 1 to 2 min. and then centrifuged at about 17,000 X g for about 10 min. from which the supernatant was retained and the calcium oxalate pellet discarded. Then about 1 to 3 mls of about 1N NaOH was added to each solution to attain a pH of about 11.5.

The following results were recorded. Scleroglucan flocs and complete viscosity losses were observed in the 0.5, 0.75 and 1% calcium chloride samples. No floc, precipitate or viscosity loss was observed in the 0% calcium chloride sample.

The morphology of the scleroglucan at the 0.5% sample was that of a soft gel with some associated strands. The 0.75% $Ca^{2+}$ scleroglucan sample was a soft gel with free-floating vesicle-type structures. The scleroglucan precipitate from the 1% $Ca^{2+}$ sample was a compact tight gel.

In conclusion, alkaline pH alone does not induce flocculation/precipitation. Calcium is required to induce this effect.

EXAMPLE 3

To five separate test tubes of a 20 ml sample of cell-free *Sclerotium rolfsii* fermentation broth the following was observed. To the first sample about 1% calcium chloride (w/v) was added followed with sufficient sodium hydroxide to adjust the pH to about 11 whereupon greater than 95% of the glucan was precipitated. To the second sample two parts of isopropanol alcohol to one part of broth was added and 100% precipitation of glucan was observed. To the third sample, sodium hydroxide was added to about pH 11 and then about 1% calcium chloride (w/v) solution was added and no precipitant was observed. To the fourth sample about 1% calcium chloride (w/v) solution was added, the sample with vortex and no precipitant observed. To the fifth sample sodium hydroxide was added to about pH 11 and no precipitant of glucan was observed. Accordingly, recovery of scleroglucan is dependant upon employing a divalent cation (i.e. calcium chloride) at an alkaline pH (i.e. pH 11), and yields about 95% scleroglucan recovery relative to current procedures such as water miscible organic solvents.

We claim:

1. A process for the recovery of a nonionic water soluble glucan comprising adding a divalent cation wherein the concentration of divalent cation in the solution is in the range of about 0.1% to about 20% volume of solution and the divalent cation is a divalent cation salt of a divalent metal of zinc, magnesium, manganese, iron, copper, colbalt, nickel and calcium combinations thereof, to a solution containing solubilized glucan and then adding a metal hydroxide until the solution has attained an alkaline pH in the range of about pH 10 to about pH 12 which results in the precipitation of the glucan.

2. The process of claim 1 wherein the glucan is produced by a filamentous fungi selected from the genera consisting of Sclerotium, Schizohyllum, Sclerotinia, Corticum, Helotium, Claviceps and Stromatinia is cultured in culture medium and the fungi secrete extracellular glucan into the culture medium and the glucan is recovered from the culture medium.

3. The process of claim 2 wherein the filamentous fungi are selected from the group consisting of the *Sclerotium delphinii, Sclerotium glucanicum, Sclerotium rolfsii, Sclerotium coffeicolum, Schizophyllum commune, Corticum rolsii, Sclerotinia gladod* and *Stromatinia narcissi*.

4. The process of claim 3 wherein the filamentous fungi are selected from the group consisting of *Sclerotium rolfsii, Sclerotium glucanicum, Sclerotium delphinii, Sclerotium coffeicolum* and *Schizophyllum commune*.

5. The process of claim 1 wherein the divalent cation is selected from the group consisting of calcium chloride, magnesium chloride, calcium sulfate, iron chloride, zinc copper, calcium hydroxide and combinations thereof.

6. The process of claim 1 wherein the divalent cation is selected from the group consisting of calcium chloride, magnesium chloride, calcium sulfate and combinations thereof.

7. The process of claim 1 wherein the concentration of divalent cation in the solution is in the range of about 0.2% to about 10% volume of solution.

8. The process of claim 1 wherein the concentration of divalent cation in the solution is in the range of about 0.5% to about 2% volume of solution.

9. The process of claim 1 wherein the solution is made alkaline in the range of about pH 10.5 to about pH 11.5 by adding the metal hydroxide to the solution.

10. The process of claim 1 where the metal hydroxide is selected from the group consisting of sodium hydroxide, potassium hydroxide and combinations thereof.

11. A process for the recovery of a nonionic water soluble glucan comprising adding a divalent cation wherein the concentration of divalent cation in the solution is in the range of about 0.1% to about 20% volume of solution and the divalent cation is a divalent cation salt of a divalent metal of zinc, magnesium, manganese, iron, copper, colbalt, nickel and combinations thereof, to a solution containing solubilized glucan and then adding a metal hydroxide selected from the group consisting of sodium hydroxide, potassium hydroxide and combinations thereof until the solution has attained an alkaline pH in the range of about PH 10 to about pH 12 which results in the precipitation of the glucan.

* * * * *